United States Patent
Utas

(10) Patent No.: US 6,430,627 B1
(45) Date of Patent: Aug. 6, 2002

(54) ENHANCED PROCESSING TECHNIQUE FOR OBJECT-ORIENTED SOFTWARE

(75) Inventor: Gregory R. Utas, Irving, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/001,111

(22) Filed: Dec. 31, 1997

(51) Int. Cl.⁷ .................................................. G06F 9/46
(52) U.S. Cl. ...................................... 709/318; 709/315
(58) Field of Search ................................. 709/315, 318, 709/104, 206; 711/118

(56) References Cited

U.S. PATENT DOCUMENTS 5,948,113 A * 9/1999 Johnson et al. ................ 714/38
6,173,336 B1 * 1/2001 Stoeckl et al. ............... 709/315

OTHER PUBLICATIONS

K. Maruyama, et al, "A Concurrent Object–Oriented Switching Program in Chill", IEEE Communications, pp. 60–68, Jan. 1991.*
E. Gamma, et al, Design Patterns, Elements of Reusable Object–Oriented Software, Addison–Wesley, 1995, Section Singleton, pp. 127–134.*
Douglas C. Schmidt & Charles D. Cranor; Half–Sync/Half–Async; pp. 1–11.
M. Nelson, et al, "A Framework for Caching in an Object–Oriented System", Sun Microsystems Laboratories, Oct. 1993, pp. 1–14.*

\* cited by examiner

Primary Examiner—St. John Courtenay, III
Assistant Examiner—S. Lao
(74) Attorney, Agent, or Firm—Haynes and Boone, LLP

(57) ABSTRACT

A method for handling multiple call processing requests by a mobile switching center having call processing software which includes an application raising a series of events to be handled in sequence, at least one of which is implemented in a single use dynamic object. For each of the events implemented in a single use dynamic object, a quasi-singleton is created and cached in a data store for later use (and re-use) in handling the event. When a request is received, the call processing handles, in sequence, a series of events. If a first one of the series of events to be handled is implemented as a quasi-singleton, the quasi-singleton is marked in use. In the event that the quasi-singleton is unavailable, however, for example, if a prior event using the quasi-singleton traps or suspends, a new quasi-singleton is created for use in handling the event. After the event has been handled, the quasi-singleton is freed, thereby making it available for re-use by either a next event in the sequence of events, next execution of the application or a first execution of a next application.

17 Claims, 3 Drawing Sheets

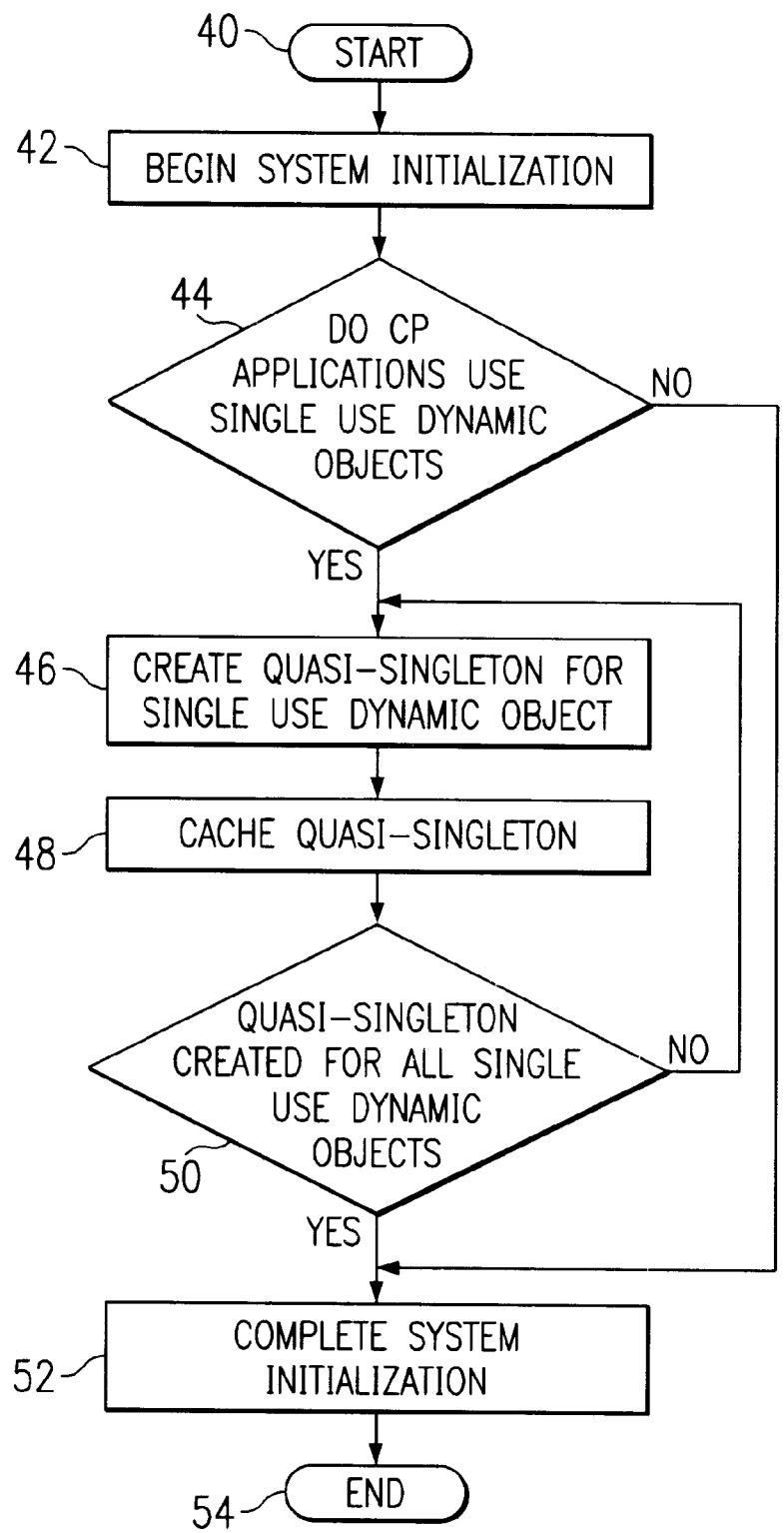

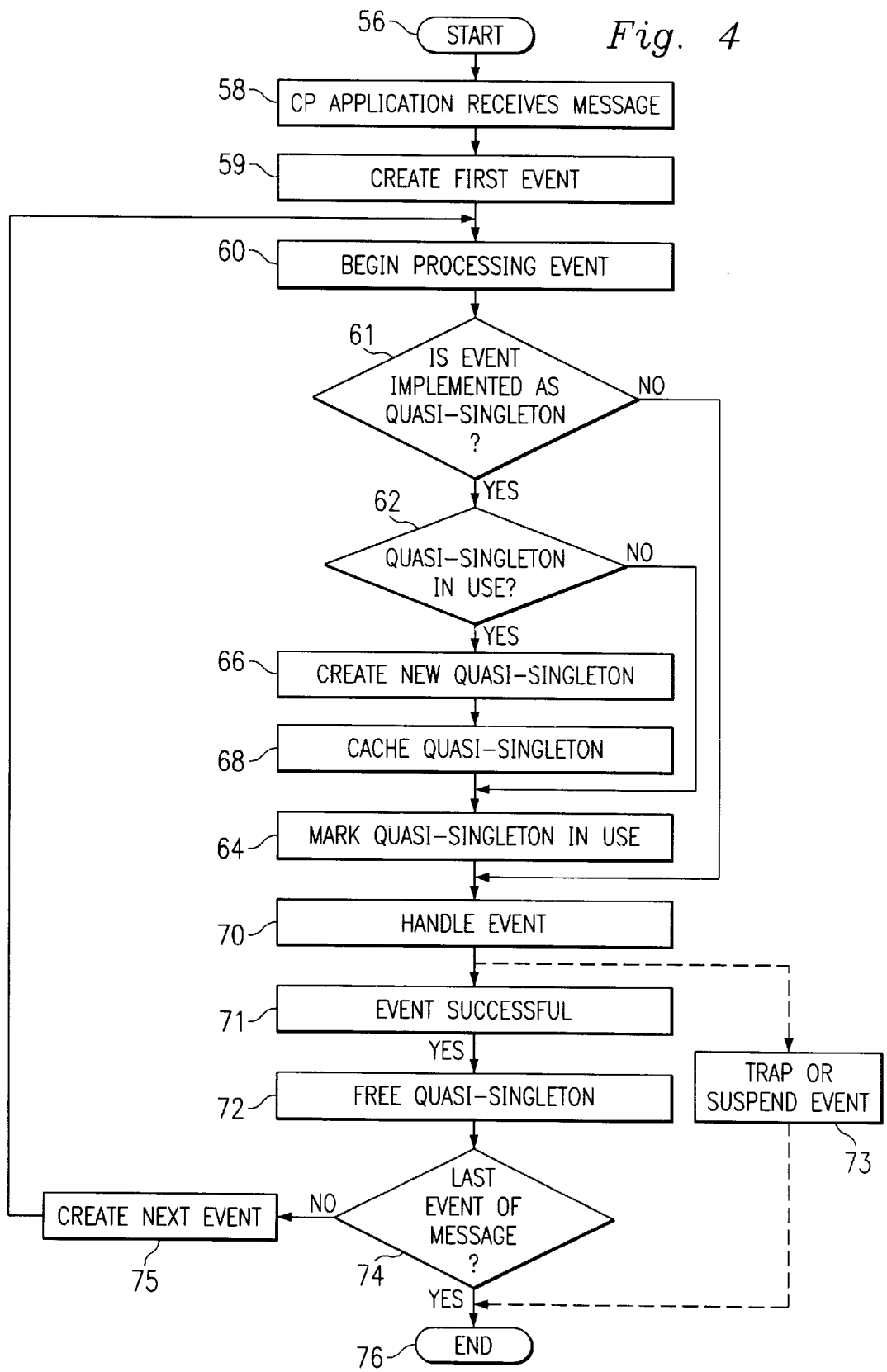

ENHANCED PROCESSING TECHNIQUE FOR OBJECT-ORIENTED SOFTWARE

TECHNICAL FIELD

The invention relates generally to processing techniques for object-oriented software applications and, more particularly, to object-oriented software applications which utilize quasi-singleton objects during the execution thereof.

BACKGROUND OF THE INVENTION

Modern telecommunication switches contain vast amounts of software. Much of it is included in the switch's CP subsystem which provides both basic call service as well as advanced features such as call forwarding, call waiting and conference calling. As the CP subsystem of a switch must be continuously available, able to process millions of transactions per hour and maintain a software error rate of 0.0001% of all calls handled thereby, configuration of the CP subsystem is oftentimes of foremost concern.

Many of the software applications which reside on a switch and form part of the CP subsystem are object-oriented in that, to execute the application, one or more objects are used by the application. An "object" is a discrete combination of code, i.e., a sequence of computer instructions, and data, i.e., information which the instructions operates on, maintained by the CP subsystem. Objects used by applications of the CP subsystem may be static or dynamic. Static objects are neither created nor destroyed because they persist across calls. For example, an object which contains a finite state machine's ("FSM's") static mappings from state-event pairs to event handlers is a static object. Other static objects are created dynamically by other subsystems but are viewed as static by the CP subsystem. For example, a trunk group manager is created when a trunk group is defined using the switch's provisioning subsystem, and a trunk group member is created when a channel on a carrier is assigned to a trunk group. Dynamic objects are typically created on a per-call basis. As a result, therefore, in most object-oriented systems, memory for dynamic objects must be allocated and deallocated as the dynamic objects are created and destroyed.

Pooling is used to minimize the time spent allocating and deallocating memory for dynamic objects. Memory comprised of a selected number of object data blocks ("ODBs") is allocated for objects when the system is initialized. The ODBs are placed in pools based upon object types. For example, a CP subsystem may include eight dynamic object pools—message, acceptor, active feature element ("AFE"), logical signaling channel ("LSC"), event, logical bearer channel ("LBC") and physical bearer channel ("PBC"). Dynamic objects may then be created using ODBs removed or "dequeued" from the ODB pool.

As should be readily appreciated, both the creation of a dynamic object, as well as its destruction, consumes time. As a result therefor, performance of a CP subsystem can be adversely affected, particularly if the one or more dynamic objects to be used thereby must be repeatedly created and destroyed. For example, if a dynamic object is created each time a request for connection is received and then destroyed when the connection is completed, a CP subsystem will have created and destroyed the same object thousands of times in a matter of minutes. While the aforementioned use of ODB pools avoid the repeated creation and destruction of dynamic objects, using ODB pools still involves a repetitive process—the continual dequeuing and requeuing of ODBs in the ODB pool. If such repetitive processes could be avoided, performance of the CP subsystem, as well as other object-oriented software systems, could be enhanced.

SUMMARY OF THE INVENTION

In one embodiment, the invention is of a method of executing a software application by first determining if execution of the software application raises an event handled by a single use dynamic object. If so, the single use dynamic object is implemented as a quasi-singleton suitable for re-use in multiple executions of the software application. During first (and next) executions of the software application, the quasi-singleton is used (and re-used) to handle the event. By implementing single use dynamic objects as quasi-singletons cached in storage, considerable processing time consumed by the repeated dequeuing and enqueuing of a dynamic object in an ODB pool is saved.

While suitable for any application, preferably, the software performs a call processing application and is incorporated in a mobile switching center or other telecommunications switch. Call processing applications are preferred since they: (1) typically raise a series of events which must be handled in sequence; and (2) are executed repeatedly. Thus, when a request for executing the application is received, it is unlikely that the quasi-singleton(s) which implement the events to be handled during execution of the application will be unavailable. If a quasi-singleton is available, processing of an event implemented as the quasi-singleton includes the step of reserving the quasi-singleton for use in handling the event. After use thereof, the quasi-singleton is freed for re-use. If the quasi-singleton is unavailable, a new quasi-singleton is created for use in handling the event. Such a result will only occur when a prior handling of an event which used the quasi-singleton was suspended or trapped.

BRIEF DESCRIPTION OF THE DRAWINGS

FIG. 3 is a method of constructing a quasi-singleton type object; and

FIG. 4 is a method of executing an object-oriented software application using a quasi-singleton type object.

DESCRIPTION OF A PREFERRED EMBODIMENT

Figure 1:
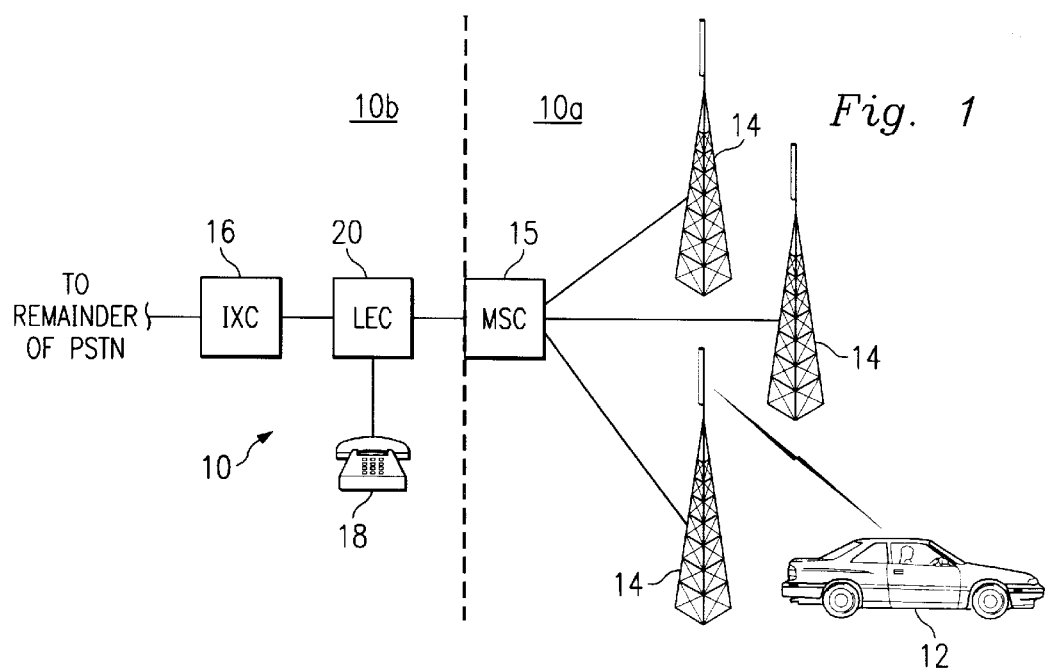
FIG. 1 is a block diagram of a telecommunications network which includes a switch constructed in accordance with the teachings of the present invention.

Turning now to the drawings, in FIG. 1, the reference numeral 10 designates a telecommunications network 10 which includes both wireless and wireline portions 10a and 10b, respectively. For example, the wireless portion 10a may be a cellular network while the wireline portion 10b may be a public switched telephone network ("PSTN"). The wireless portion 10a of the telecommunications network 10 includes at least one mobile terminal 12 configured to transmit and receive messages to a mobile switching center ("MSC") 15 via a base station 14 within range of the mobile terminal 12 and coupled to the MSC 15. The wireline portion 10b of the telecommunications network 10 includes plural interexchange carriers (or "IXCs") 16 for establishing between originating and destination terminals. While the wireline portion 10b of the telecommunications network 10 would typically include plural IXCs, for ease of illustration, only one such IXC 16 is shown in FIG. 1. Voice terminals, for example, for example, a telephone 18, are coupled to the to the wireline portion 10b of the telecommunications network 10 by a local exchange carrier (or "LEC") 20 which, for example, may be a respective regional Bell Operating Company (or "RBOC"). Again, while the wireline portion 10b of the telecommunications network 10 would typically include plural voice terminals and LECs, for ease of illustration, only one such voice terminal 18 and LEC 20 are shown in FIG. 1. Finally, to couple the wireless and wireline portions 10a and 10b of the telecommunications network 10, the MSC 15 is coupled to LEC 20. Thus, a request for connection by the mobile terminal 12 may be directed by the MSC 15 to (1) a second mobile terminal registered with the MSC 15 and within range of one of the base stations 14, (2) a voice terminal coupled to the LEC 20 which serves the same geographical area as the MSC 15, or (3) a voice terminal coupled elsewhere to the telecommunications network 10 for which the connection path would be directed from the IXC 16 to its destination elsewhere in the telecommunications network 10.

Figure 2:
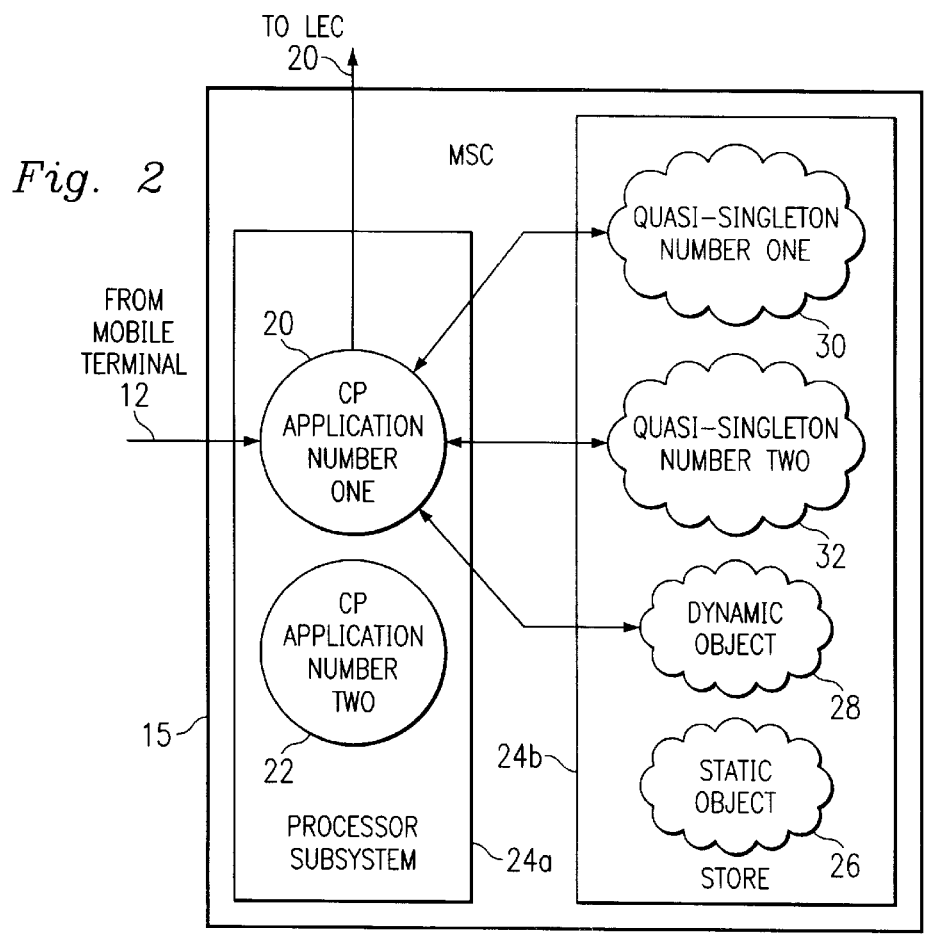
FIG. 2 is an expanded block diagram of a mobile switching center of the telecommunications network of FIG. 1.

Referring next to FIG. 2, the MSC 15 may now be seen in greater detail. Of course, it should be clearly understood that the MSC 15 has been greatly simplified and that various components thereof have been omitted for ease of illustration. The MSC 15, which, for example, may be a DMS-GSM MSC manufactured by Northern Telecom Ltd. of Montreal, Canada, performs a variety of call processing ("CP") operations such as call set-up, call forwarding and conference calling For example, in a call set-up operation, the MSC 15 would establish a connection between an originating terminal, for example, the mobile terminal 12, coupled to the MSC 15 by the base station 14, and a destination terminal, for example, the telephone 16, coupled to the MSC 15 by the LEC 18.

To perform these and other CP operations, the MSC 15 will typically include a processor subsystem 24a on which plural CP applications will reside as software modules. For example, FIG. 2 shows first and second CP applications 20 and 22 residing in the processor subsystem 24a of the MSC 15. Both the first and second CP applications 20 and 22 are configured to perform a respective call processing task and are object-oriented programs ("OOPs") which use on or more objects during the execution thereof For example, as disclosed herein, the first CP application 20 is a call handler application which is completing a connection between the mobile terminal 12 and the voice terminal 18 coupled to the LEC 18.

Both the first and second CP applications 20 and 22 are OOP applications. As previously set forth, an object is comprised of a combination of data and instructions which collectively perform a function. For example, an application may use an object to handle an event which occurs during execution of the application. One or more objects reside in a store 24b of the MSC 15. For example, FIG. 2 shows a static object 26, a dynamic object 28, and first and second quasi-singletons 30 and 32 as residing in the store 24b. Typically, the store 24b is a previously allocated portion of a memory subsystem (not shown) of the MSC 15.

Referring next to FIG. 3, a method of initializing the MSC 15 to produce one or more quasi-singletons will now be described in greater detail. The method commences at step 40 and, at step 42, the MSC 15 is initialized. During the initialization process, the method proceeds to step 44 where the CP applications residing on the MSC 15, here, the CP applications 20 and 22, are examined to determine if execution of the applications will involve the use of one or more single use dynamic objects. More specifically, execution of the CP applications 20 and 22 involves the respective processing of a series of events. If, to process an event of the CP application 20 or 22, the application must create an object for use thereby, such an object is dynamic. If the dynamic object to be created is such that only one instance of the object will be in use at any given time, i.e., when one or more CP applications are being executed, only a single use of the dynamic object will occur at any given time, the dynamic object is a single use dynamic object. For example, since a CP application typically involves completion of a sequence of call processing events, a call processing event forming part of that sequence is a single use dynamic object since only one of the call processing events may be handled at one time.

If a single use dynamic object is identified at step 44, the method proceeds to step 46 where a quasi-singleton is created for the single use dynamic object by obtaining the dynamic object and then saving a reference to it. This enables the quasi-singleton to be reused, in a sequential manner, by subsequent users without the need for continual dequeuing and enqueuing thereof. Thus, the first time that it is required, as well as on any subsequent occasion in which the current instance of the quasi-singleton is marked "in use", for example, when the previous user of the quasi-singleton trapped or suspended, the quasi-singleton is allocated in the same way as a dynamic object. Once created, the quasi-singleton overrides new by invoking the command singleton_new whose parameter is a pointer to the quasi-singleton. The quasi-singleton also overrides destroy by invoking singleton_destroy. After creation of the quasi-singleton is complete, the method proceeds to step 48 where the newly created quasi-singleton is marked available and cached in the store 24 for future use.

Continuing on to step 50, if there are additional applications residing on the MSC 15 which include the use of single use dynamic objects, the method returns to step 46 where a quasi-singleton is then created from a next single use dynamic object. If, however, quasi-singletons have been created for each of the single use dynamic objects used by the applications residing on the MSC 15 or, if it was determined at step 44 that none of the applications residing on the MSC 15 include the use of a single use dynamic object, the method proceeds to step 52 where system initialization is completed. The method then ends at step 54.

Referring next to FIG. 4, a method of using one or more quasi-singletons during the execution of a CP application, for example, the CP application 20, will now be described in greater detail. The method starts at step 56 and, at step 58, the CP application 20 receives a message. For example, the CP application 20 may receive a request, from the mobile terminal 12, for connection to the voice terminal 18. To handle a request requires completion of a sequence of events. For example, a request for connection from a mobile terminal 12 typically involves a sequence of events which includes, in part: (1) getting a user profile for the requesting terminal; (2) authorizing the user; (3) determining validity of the request; and (4) determining validity of the requested destination.

The CP application 20 begins handling of the received message at step 59 by creating the first event of the message. Typically, the first event of an arriving message is the "Analyze Message" event, an event which is allocated as a quasi-singleton. The method proceeds to step 60 where the CP application 20 begins processing of the event. At step 61, a determination is made as to whether the event being processed is implemented as a quasi-singleton. If the event is not so implemented, the method proceeds to step 70 for handling of the event. If, however, the event is implemented as a quasi-singleton, the method instead proceeds to step 62 where, for the event implemented as a quasi-singleton, a determination is made if the quasi-singleton is in use. If the quasi-singleton is available, the method proceeds to step 64 where the quasi-singleton is marked "in use" and then on to step 70 for handling of the event.

Returning momentarily to step 62, if, however, it is determined that the quasi-singleton is in use, for example, if the prior handling of an event implemented as the quasi-singleton has either trapped or suspended, the method proceeds to step 66 where a new quasi-singleton is created in the method previously described with respect to FIG. 3. The method then continues on to step 68 where the newly created quasi-singleton is cached in the store 24 and then back to step 64 where the newly created quasi-singleton is marked "in use." From here, the method again proceeds on to step 70 for handling of the event.

At step 70, the event is handled in the following manner. First, the event handler (another quasi-singleton) associated with the event to be handled is called. The event allocated by the event handler is then processed. Oftentimes, processing of the event will entail the calling of a next event handler and processing of the event allocated by the next event handler. This process continues until completion, i.e., there is no further events to process.

If the event handling process continues to completion, the method proceeds to step 71 where the event is deemed "successful" and on to step 72 where, if the event was implemented as a quasi-singleton, the quasi-singleton used to handle the event is freed by re-marking the quasi-singleton as "available" for use in handling a next event. Of course, if the quasi-singleton to be freed is not the one referred to by the pointer, then the quasi-singleton is freed in a manner similar to that used in connection with a standard dynamic object, i.e., by enqueuing it in the ODB pool. This occurs if a new quasi-singleton was allocated before the previous one was freed, a situation which occurs whenever a previous user traps or suspends.

Continuing on to step 74, if there additional events which need to be handled, the method proceeds to step 75 where the next event is created. The method then returns to step 60 for handling of the next event. As creation and handling of the next event proceeds in a manner very similar to that previously described, further description of these steps is not believed to be necessary. If, however, there are no further events to be handled, the complete sequence of events which must be performed in order to complete processing of the received message has been handled. When this occurs, the CP application 20 transmits a reply to the mobile terminal 12 which originated the message. The method then ends at step 76.

Returning momentarily to step 71, if, during processing of the event to completion, one of the called events traps or suspends, the method instead proceeds to step 73 where, as a trap or suspension has occurred, processing of the event is deemed "unsuccessful" and the method ends at step 76.

Although illustrative embodiments of the invention have been shown and described, other modifications, changes, and substitutions are intended in the foregoing disclosure. For example, while two CP applications 20 and 22 are disclosed as residing in the processor subsystem 24a, it is specifically contemplated that any number and/or type of CP applications may reside therein. Furthermore, while the invention is disclosed as residing in an MSC of a cellular telecommunications network, it is equally suitable for use in IXCs, LECs and other telecommunications devices. Finally, while the invention disclosed herein handles certain events for CP applications executed within an MSC of a cellular telecommunications network, the invention is equally suitable for use within a wide variety of computer systems, particularly those which include object-oriented software applications characterized by the use of dynamic objects in sequences of events subject to repeated executions thereof. Accordingly, it is appropriate that the appended claims be construed broadly and in a manner consistent with the scope of the invention.

What is claimed is:

1. A method of executing a software application, the method comprising:

determining if execution of a first software application raises an event handled by a single use dynamic object;

implementing said single use dynamic object as a quasi-singleton, wherein implementing said single use dynamic object as a quasi-singleton includes:

creating a quasi-singleton for said single use dynamic object; and caching said quasi-singleton in a data store;

during a first execution of said first software application, using said quasi-singleton to handle said event, wherein using said quasi-singleton includes:

receiving a message;

determining if a first event of said message is implemented by a quasi-singleton;

if said first event is implemented as a quasi-singleton, determining if said quasi-singleton is in use;

if said quasi-singleton is not in use, reserving said quasi-singleton for use in handling said first event of said message; and if said quasi-singleton is in use, creating a new quasi-singleton for use in handling said first event of said message.

2. The method of claim 1 and further comprising the step of:

during a next execution of said first software application, reusing said quasi-singleton to handle said event.

3. The method of claim 1 and further comprising the steps of:

determining if execution of a second software application raises said event handled by said single use dynamic object; and during a first execution of said second software application, using said quasi-singleton to handle said event.

4. The method of claim 1 and further comprising the step of:

freeing said quasi-singleton after said first event has been handled.

5. For a switch having call processing software residing thereon, said call processing software including a call processing application which includes a series of events to be handled in sequence, a method of handling a plurality of call processing requests using said call processing application, comprising the steps of:

determining if one or more of said events to be sequentially handled during execution of said call processing application are to be handled using a respective single use dynamic object;

for each of said events to be handled using a respective single use dynamic object, implementing said single use dynamic object as a quasi-singleton;

receiving a first call processing request;

determining if said first call processing event includes a first event implemented as a quasi-singleton;

reserving said quasi-singleton which implements said first event by:

determining whether said quasi-singleton which implements said first event is in use;

if determined to not be in use, reserving said quasi-singleton; and if determined to be in use, creating a new quasi-singleton;

using said implemented quasi-singleton to handle said first call processing request;

receiving a next call processing request; and re-using said implemented quasi-singleton to handle said next call processing request.

6. The method of claim 5 wherein the step of implementing said single use dynamic object as a quasi-singleton further comprises the steps of:

creating a quasi-singleton for said single use dynamic object; and caching said quasi-singleton in a data store.

7. The method of claim 6 wherein the step of using one or more of said implemented quasi-singletons to handle said first call processing request further comprises the steps of:

processing the first event included in said first call processing request; and upon successfully completing said first event, freeing said reserved quasi-singleton.

8. The method of claim 7 and further comprising the step of caching said newly created quasi-singleton in said data store.

9. The method of claim 8 wherein the step of using one or more of said implemented quasi-singletons to handle said first call processing request further comprises the steps of:

reserving said newly created quasi-singleton for use in handling said first event of said first call processing request; and upon handling said first event, freeing said newly created quasi-singleton.

10. A switch for a telecommunications network, comprising:

a first call processor application which includes a series of events to be handled in sequence;

a quasi-singleton coupled to said first call processor application, said quasi-singleton configured to handle a first one of said series of events of said call processor application; and a set of instructions accessible to the first call processor application and the quasi-singleton, the set of instructions operable for:

determining if the quasi-singleton is in use;

if determined to not be in use, reserving said quasi-singleton; and if determined to be in use, creating a new quasi-singleton.

11. A switch according to claim 10 and further comprising a processor subsystem on which said call processing application resides.

12. A switch according to claim 11 and further comprising a data store in which said quasi-singleton is cached.

13. A switch according to claim 12 wherein said switch is a mobile switching center.

14. A method of executing at least a first software application, the first software application associated with an object creation process and an object destruction process, the method comprising:

analyzing the first software application to determine if the first software application raises an event handled by a single use dynamic object;

implementing the single use dynamic object as a first quasi-singleton, the first quasi-singleton associated with a quasi-singleton creation process and a quasi-singleton destruction process;

overriding the object creation process with the quasi-singleton creation process; and overriding the object destruction process with the quasi-singleton destruction process.

15. The method of claim 14 wherein the quasi-singleton creation process includes a pointer referencing the first quasi-singleton.

16. The method of claim 15 further comprising handling the event, the handling including:

receiving a message including the event;

determining if the event is implemented by the first quasi-singleton;

if the event is implemented by the first quasi-singleton, determining if the first quasi-singleton is in use;

if the first quasi-singleton is not in use, reserving the first quasi-singleton for use in handling the event; and if the first quasi-singleton is in use, creating a second quasi-singleton for use in handling the event.

17. The method of claim 15 further comprising:

during a first execution of the first software application, using the quasi-singleton to handle the event; and if a second execution of the first software program occurs, reusing said quasi-singleton to handle said event.

* * * * *